(12) United States Patent
Jones (10) Patent No.: US 6,212,710 B1
(45) Date of Patent: Apr. 10, 2001

(54) FOLDING VEHICLE BED ASSEMBLY (75) Inventor: Thomas G. Jones, Riverside, CA (US)

(73) Assignee: Fleetwood Enterprises, Inc.

( * ) Notice: Subject to any disclaimer, the term of this patent is extended or adjusted under 35 U.S.C. 154(b) by 0 days.

(21) Appl. No.: 09/272,891

(22) Filed: Mar. 19, 1999

(51) Int. Cl.$^7$ ................................ A47G 17/80; B60P 3/39
(52) U.S. Cl. ................................ 5/118; 5/133; 5/136; 5/2.1; 296/170; 296/174
(58) Field of Search .............................. 5/118, 136, 139, 5/140, 141, 147, 159.1, 927, 2.1, 137, 133; 296/170, 171, 172, 173, 174, 175, 176

(56) References Cited

U.S. PATENT DOCUMENTS

| 335,283 | | 2/1886 | Hamilton | 297/125 |
|---|---|---|---|---|
| 463,221 | | 11/1891 | Snyder | 5/142 |
| 474,868 | | 5/1892 | Snyder | 5/142 |
| 580,359 | * | 4/1897 | Anthony | 5/133 |
| 1,224,738 | | 5/1917 | Goodcell | 5/142 |
| 1,255,710 | * | 2/1918 | Cox | 5/2.1 |
| 1,419,586 | * | 6/1922 | Plackard | 5/2.1 |
| 1,542,766 | * | 6/1925 | Hall | 5/140 |
| 1,628,763 | | 5/1927 | Bayer | 5/142 |
| 1,915,507 | | 6/1933 | Wright | 5/133 |
| 2,038,410 | | 4/1936 | Bridenbaugh | 5/133 |
| 2,067,136 | | 1/1937 | Bridenbaugh | 5/133 |
| 2,565,417 | * | 8/1951 | Woller | 5/147 |
| 2,669,730 | | 2/1954 | Bystrom | 5/136 |
| 2,671,230 | * | 3/1954 | Potter | 5/2.1 X |
| 2,672,624 | * | 3/1954 | Giuseffi | 5/136 |
| 2,770,813 | | 11/1956 | Marzillier | 5/2.1 |
| 3,088,127 | * | 5/1963 | Eames | 5/2.1 |
| 3,402,960 | * | 9/1968 | Erke | 296/174 |
| 3,540,066 | | 11/1970 | Morrison | 5/141 |
| 3,755,831 | * | 9/1973 | Bergmann | 5/2.1 |
| 3,755,832 | * | 9/1973 | Bennett | 5/2.1 |
| 3,858,253 | * | 1/1975 | Lauzon | 5/2.1 |
| 3,965,498 | * | 6/1976 | Boni | 5/159.1 X |
| 4,318,195 | | 3/1982 | Reppas . | |
| 4,329,746 | | 5/1982 | Bergerud | 5/136 X |
| 4,370,766 | * | 2/1983 | Teague, Jr. | 5/133 |
| 4,534,076 | * | 8/1985 | Barge | 5/133 X |
| 4,631,763 | * | 12/1986 | Singer | 5/159.1 X |
| 4,759,582 | * | 7/1988 | Kutzner | 5/118 X |
| 5,011,216 | * | 4/1991 | Baughman | 296/176 X |
| 5,061,006 | * | 10/1991 | Baughman | 296/172 X |
| 5,092,650 | * | 3/1992 | Perlot | 5/118 X |
| 5,154,469 | * | 10/1992 | Morrow | 296/171 X |
| 5,248,180 | * | 9/1993 | Hussaini | 296/171 |
| 5,446,932 | * | 9/1995 | Voorhis | 5/159.1 X |
| 5,638,560 | * | 6/1997 | Rigdon et al. | 5/118 |
| 5,983,576 | * | 11/1999 | Hanser et al. | 296/170 X |

FOREIGN PATENT DOCUMENTS

| 518147 | * | 11/1955 | (CA) | 5/2.1 |
|---|---|---|---|---|
| 1912218 | * | 10/1969 | (DE) | 296/174 |
| 3531394 | * | 3/1987 | (DE) | 296/176 |
| 972519 | * | 9/1948 | (FR) | 5/136 |
| 1242610 | * | 12/1959 | (FR) | 5/136 |
| 1513323 | * | 10/1966 | (FR) | 5/136 |
| 2617449 | * | 7/1987 | (FR) | 296/172 |
| 294936 | * | 10/1929 | (GB) | 5/2.1 |
| 696747 | * | 9/1953 | (GB) | 5/2.1 |

* cited by examiner

Primary Examiner—Terry Lee Melius
Assistant Examiner—Robert G. Santos
(74) Attorney, Agent, or Firm—Price and Gess (57) ABSTRACT The folding vehicle bed assembly includes a housing member that can be connected to a vertical support wall and a bed frame that can be stored within the housing member or extended for use. A movable support lever provides a first pivotal connection to the bed frame to enable the bed frame to rotate when moved from an operative horizontal position to a vertical storage position. A second pivotal connection is attached to the end of the bed frame adjacent to the vertical support wall and above the height of a mattress. A motor assembly is connected to the second pivotal connection to drive it parallel to the vertical support wall and to rotate the end of the bed frame about the second pivotal connection.

17 Claims, 8 Drawing Sheets

FOLDING VEHICLE BED ASSEMBLY

BACKGROUND OF THE INVENTION

1. Field of the Invention

The present invention is in the field of recreational vehicles and trailers that can incorporate a folding bed and, more particularly, a combination folding bed with accessory furniture items that can be motor driven for storage in a minimal storage area.

2. Description of Related Art

Convertible furniture units have been subject to numerous innovations over a considerable period of time in an effort to provide an economic usage of space. Recreational vehicles and trailers have also attempted to maximize the living space that is available by including convertible tables, sofas, etc.

U.S. Pat. No. 3,540,066 represents a proposal to provide a foldable bed for a trailer that could be manually stored. A triangular hinge member is designed to provide leverage to permit an initial rotation of a bed frame about a first pivot point and then a second pivot point is used to provide a second rotation of the bed into a vertical storage position.

U.S. Pat. No. 4,318,195 discloses a convertible furniture unit that includes an upper platform in the form of a bed or a table and a lower platform that can be structured into a desk. The upper platform can be manually positioned, while the lower platform can be driven by motors mounted within the various components. A torsion bar can provide a spring force. Another example of a combination wardrobe and bed assembly can be found in U.S. Pat. No. 2,770,813.

Examples of motor driven folding beds can be seen in U.S. Pat. Nos. 1,915,507, 2,038,410, and 2,067,136.

Finally, folding bed assemblies of general interest can be found in U.S. Pat. Nos. 463,221, 4,748,868, 1,224,738, 1,628,763, and 4,329,746.

The prior art is still seeking to optimize a folding bed assembly and the field of recreational vehicles is still seeking a folding bed assembly which is particularly adapted to be used in a vehicle that can be economically manufactured to ensure a safe and reliable convenience to the occupants.

OBJECTS AND SUMMARY OF THE INVENTION

The present invention provides a folding bed assembly having a housing member for connection to a vertical support wall, such as the wall of a trailer or a recreational vehicle. A bed frame that is capable of being stored within the housing member is provided for supporting a mattress. A movable support lever provides a first pivotal connection to the bed frame so that the bed frame can rotate about the first pivotal connection when moved from an operative horizontal position to a vertical storage position. The movable support lever is preferably pivotally mounted to a base of the housing member. The movable support lever is ultimately moved towards the vertical support wall as the bed frame moves from the horizontal position to a vertical storage position. A second pivotal connection is attached to an end of the bed frame adjacent the vertical support wall and above a height of the mattress. A motor assembly which can include a power transmission shaft connected to a pair of drive gears for, respectively, driving a pair of rack members in a linear vertical direction is appropriately connected to the second pivotal connection. Accordingly, the second pivotal connection can be driven approximately parallel to the vertical support wall to provide a force vector to rotate the end of the bed frame about the second pivotal connection as the bed frame also rotates about the first pivotal connection when moving from the horizontal position to a vertical storage position. The use of a linearly driven second pivotal connection in combination with a first pivotal connection at one end of a lever provides a relatively simple, while sturdy and economical arrangement for ensuring that the bed frame is closely aligned with the support wall so that the mattress is immediately positioned to ensure a reduced storage space. The pair of elongated rack members are journaled within the housing member to provide only a linear vertical movement when they are driven by the respective drive gears. The movable support lever will be aligned parallel to the vertical support member and parallel to a longitudinal axis of the bed frame when the bed frame is in its vertical storage position. A pair of triangular brackets can be connected as a portion of the bed frame to provide the first pivotal connection and the second pivotal connection at apex points.

The lower portion of the bed frame can support a modular furniture accessory item, such as a foldable desk and credenza that can be extended when the bed frame is in a vertical storage position. About the perimeter of the housing member or even incorporated into a portion of the housing member can be additional storage cabinets and end tables to supplement the folding bed assembly.

Accordingly, a highly attractive and space-saving arrangement can be utilized that is of particular advantage in a vehicle.

As an additional feature, the folding bed assembly can be installed in a combination with an extensible cabin or room of a vehicle to provide a novel and efficient use of space.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art of recreational vehicles, since the generic principles of the present invention have been defined herein specifically to provide a folding vehicle bed assembly alone or in combination with an extensible room in a vehicle.

Figure 1:
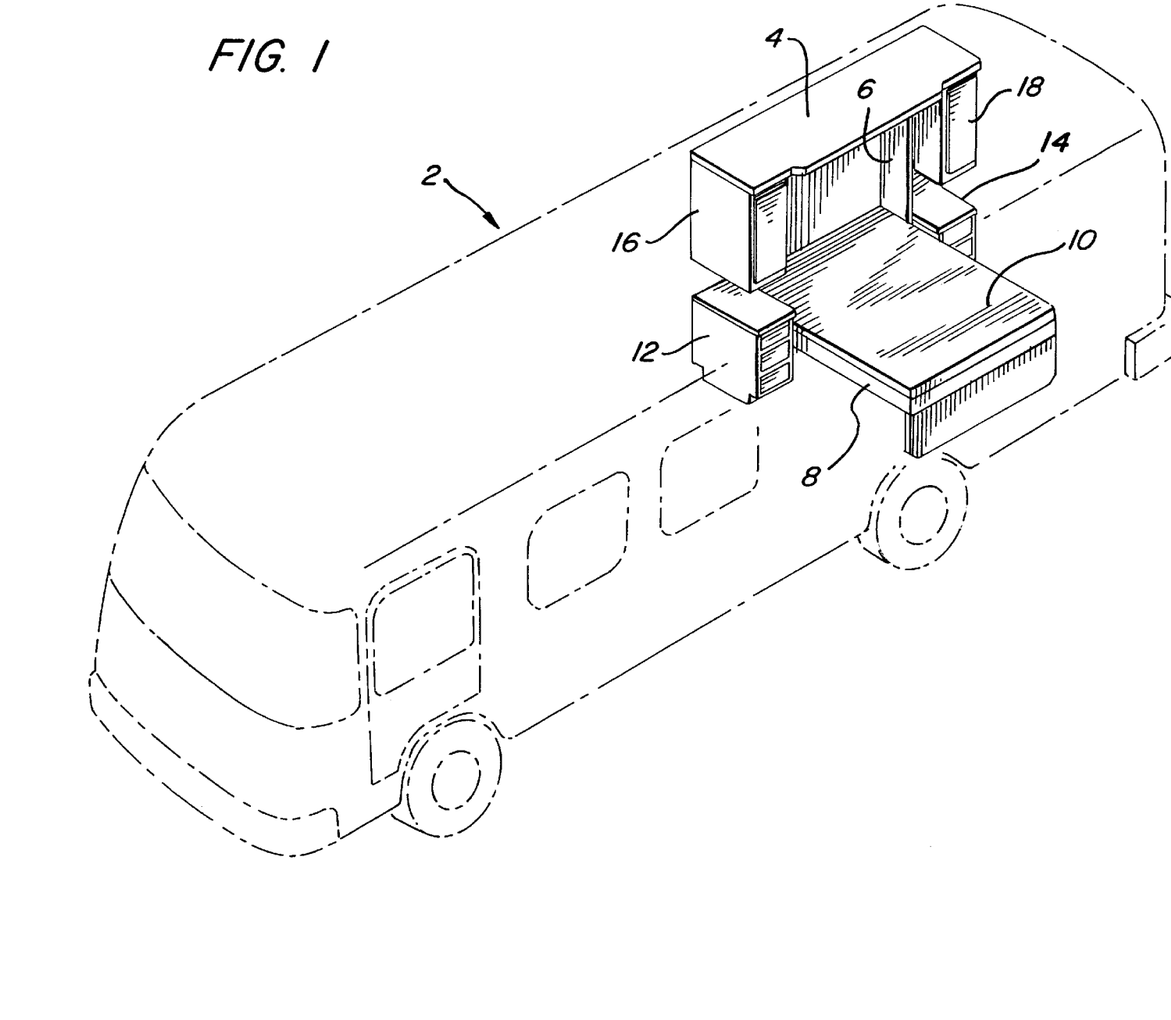
FIG. 1 is a perspective view of a vehicle of a combination bed furniture assembly positioned within the vehicle.

Referring to FIG. 1, a perspective view of a vehicle 2, such as a recreational vehicle, is disclosed. The invention can be equally applicable to trailers and can be further advantageously used with slide-out cabins. A combination bed assembly 4 includes a housing member 6 that provides a structure for storing the bed frame 8 when in a vertical storage mode. A mattress 10 is securely mounted on the bed frame 8. Extending around the periphery of the housing member 6 can be small storage cabinets or night-stands 12 and 14. Additional storage cabinets 16 and 18 can be cantilevered from the housing member 6 and its adjacent vertical support wall on the vehicle 2 to provide a spacious and pleasant bed and accessory arrangement for the occupants.

Figure 2:
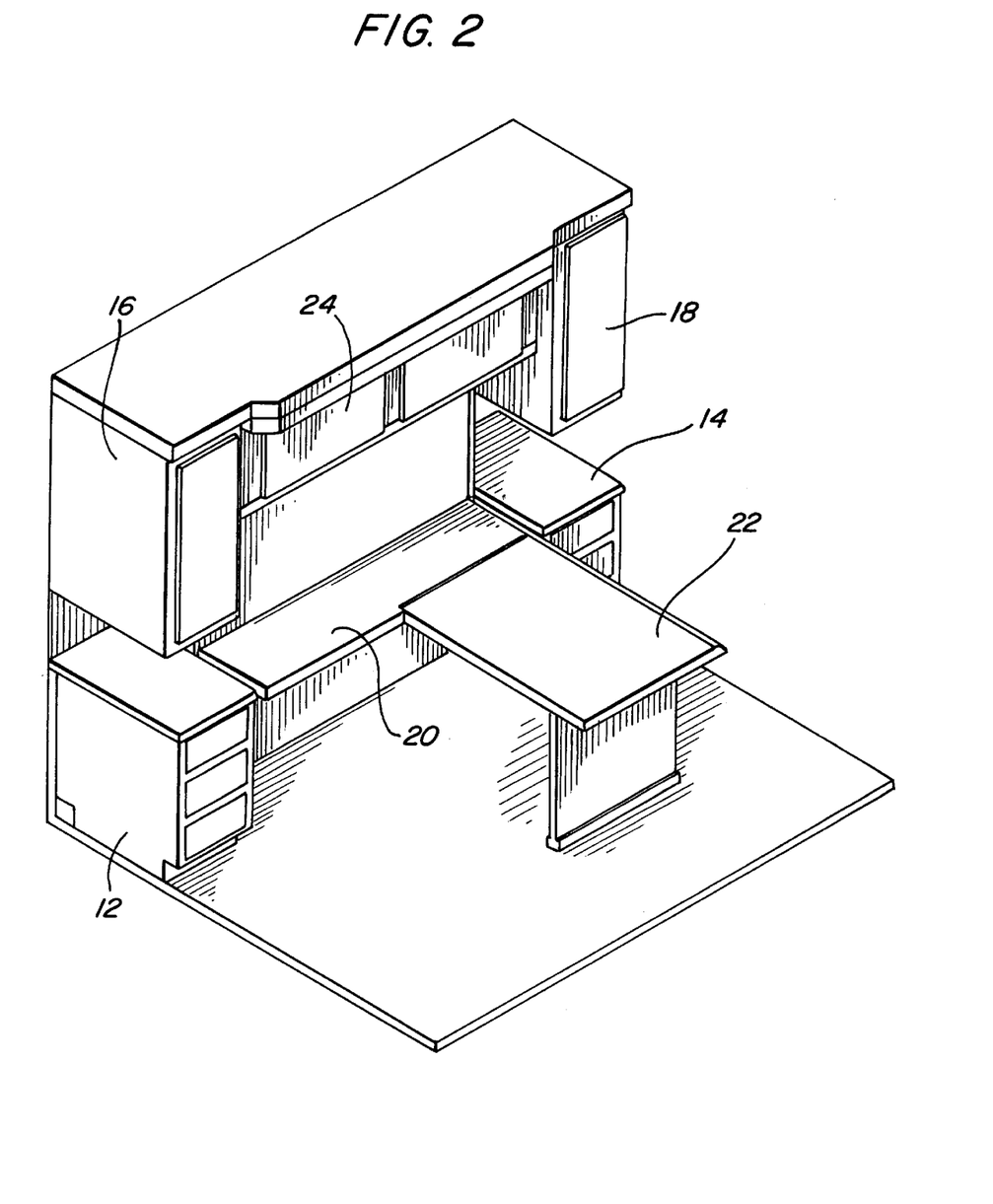
FIG. 2 is a perspective view of the folding bed of the present invention in a storage position with a desk and credenza accessory in an operative position.

FIG. 2 represents a perspective view of the combination bed assembly 4 with the bed frame 8 in a vertical storage position so that a credenza 20 and a folding desk 22 are in an operative extended position perpendicular to the bottom of the bed frame 8. Additional storage cabinets 24 can be positioned beneath the bed frame 8 and can be become operative when the bed frame 8 is in the vertical storage position. As can be readily appreciated, a useful work area can be provided in the position where the bed frame 8 has previously occupied space in the vehicle.

Figure 3:
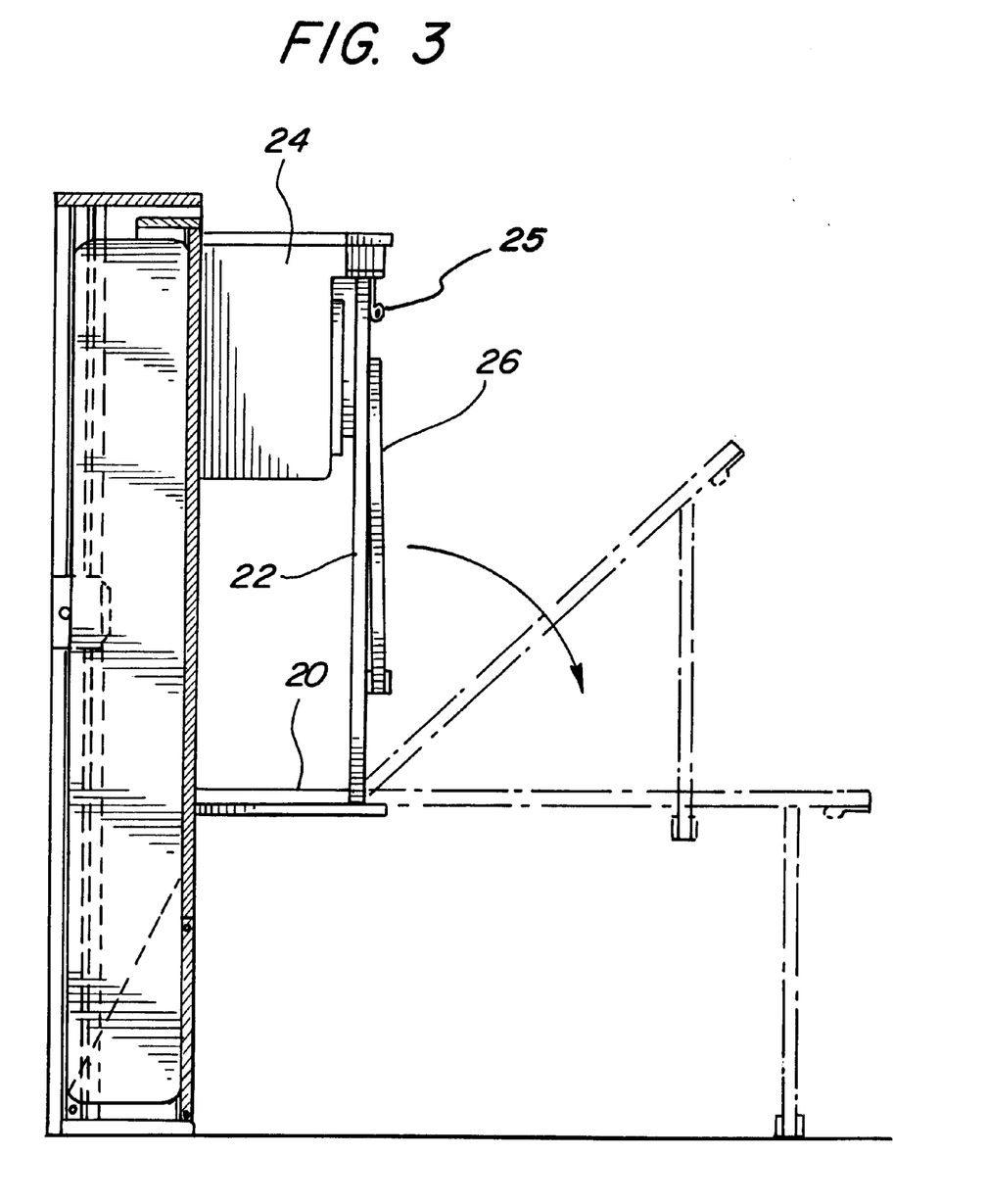
FIG. 3 is cross-sectional view of the foldable bed and desk combination in a storage position.

FIG. 3 discloses a cross-sectional side schematic view of a portion of the combination bed assembly 4 with the credenza 20, folding desk 22, and storage cabinets 24. The folding desk 22 also includes a pivotal support leg 26. Manual locking members 25 can hold the folding desk 22 in the vertical storage position for safety. As can be appreciated, the credenza 20 and storage cabinets 24 also serve to support the bed frame 8 in an operative horizontal position.

Figure 4:
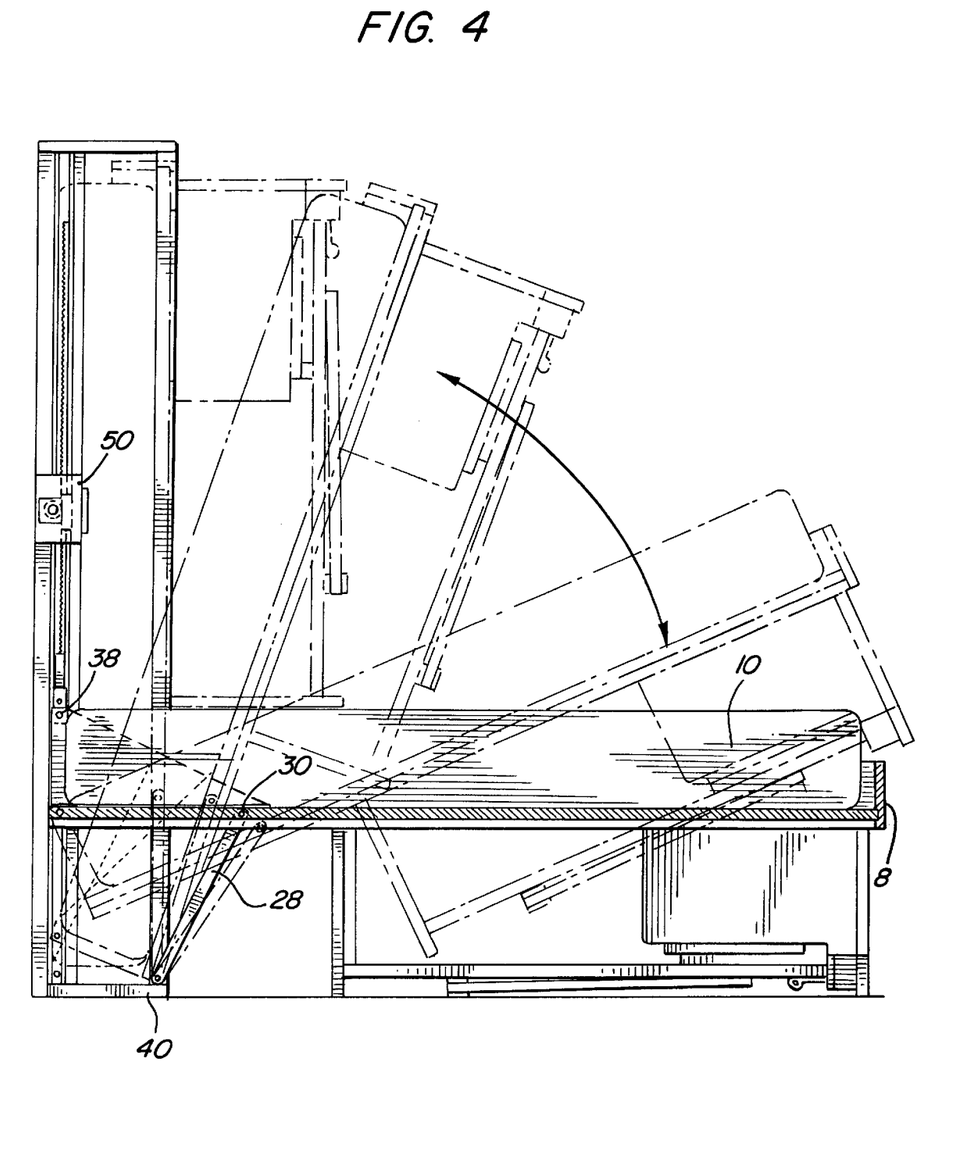
FIG. 4 is a side view of the foldable bed in an operative horizontal position.
Figure 5:
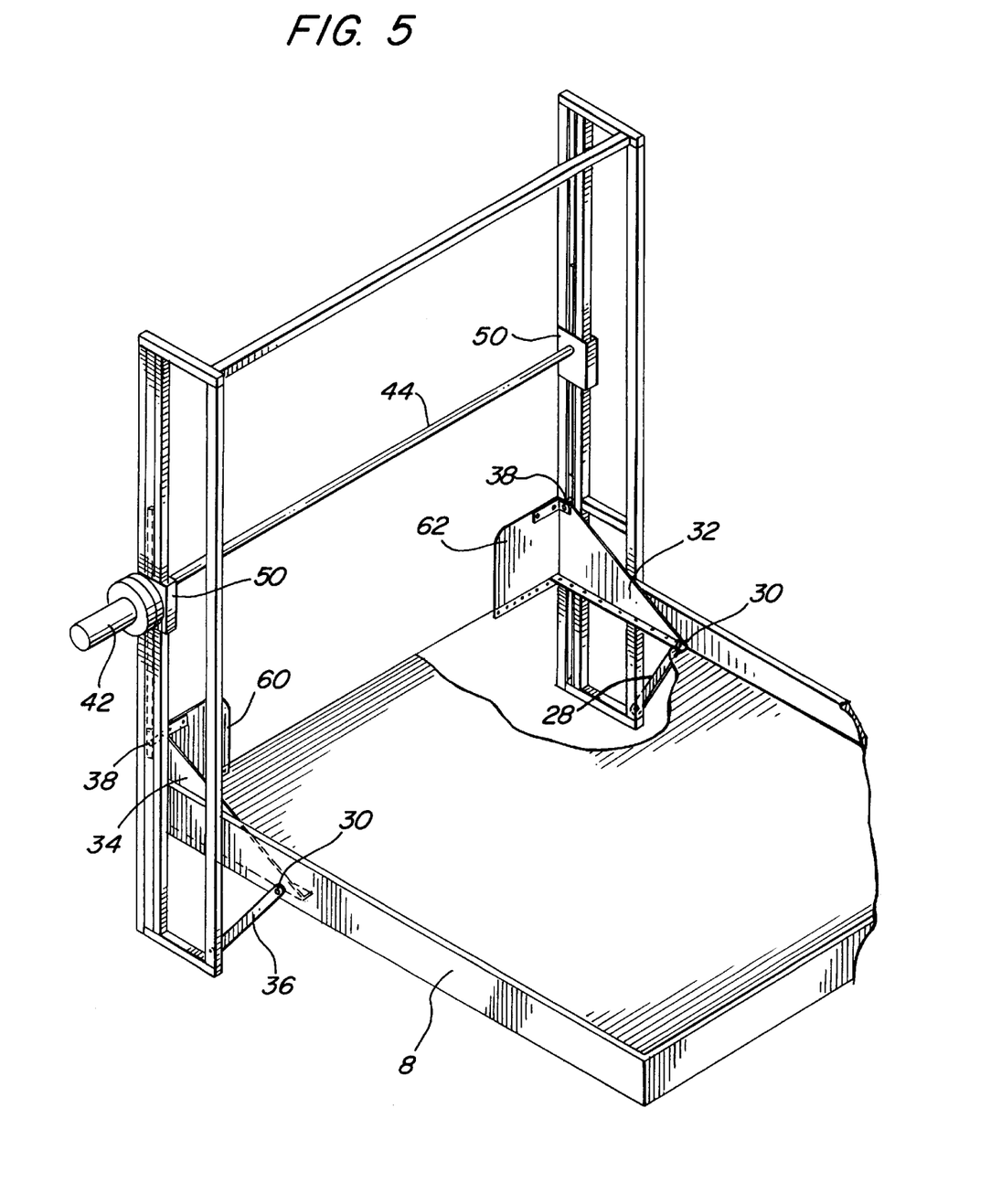
FIG. 5 is a partial perspective view of the motor assembly and bed frame in an extended position.

FIG. 4 discloses the bed frame 8 extended and shows, in dash lines, the various movement of the bed frame 8 from the horizontal operative position to a vertical storage position. The bed frame 8 has a longitudinal axis that will be positioned approximately parallel to the support vertical wall with the mattress 10 immediately adjacent a back wall of the housing 6 and the vertical support wall of the vehicle. The bed frame 8 is pivotally supported on a support lever 28. The lever member 28 is also pivotally supported about a first pivotal connection 30 to a metal triangular frame member 32 which forms a portion of the bed frame 8. Another metal triangular frame member 34 is provided on the other side of the bed frame 8 along with another support lever 36, as seen in FIG. 5. A pair of second pivotal connections 38 is provided in apexes of the triangular frame members and they are positioned sufficiently above the bed frame 8 so that they will be above the position of the mattress 10. The respective support lever members 28 and 36 are pivotally mounted to a base 40 of the housing member 6.

As can be seen in FIG. 4, the support levers 28 and 36 extend outward at an angle to a vertical plane when the bed frame 8 is in an operative horizontal position. As the bed frame 8 is rotated so that its longitudinal axis becomes parallel to the vertical support wall of a trailer, the respective support levers 28 and 36 rotate to a parallel vertical alignment with a longitudinal axis of the bed frame 8. As can be appreciated, the first pivotal connections 30 on each of the support levers permit the bed frame 8 to rotate about the first pivotal connections 30 and to support the weight during the rotation. The second pivotal connections 38 can be driven in a linear direction approximately parallel to the vertical support wall to provide a force vector, F, for driving the rotation of the bed frame 8 about the first pivotal connections 30. Thus, by driving the second pivotal connections 38 in a linear direction, the bed frame 8 rotates about the first pivotal connections 30 as the respective support levers 28 and 36 pivot to accommodate the rotation of the bed frame 8. As can be seen in FIG. 4, an economy of space is achieved, since the edge of the bed frame 8 adjacent the vertical support wall stays in close proximity as the bed frame 8 rotates and the bed frame 8 and the mattress 10 are stored immediately adjacent the vertical support wall without requiring the use of counter-balancing springs.

A 12-volt D.C. motor is capable of generating 550-inch pounds of torque and can be used as the motor 42 that is mounted halfway up the housing member 6. The motor 42 can incorporate an electrically releasable holding brake with a manual override release to ensure the folding bed can be moved, if electrical power is lost. A transmission power shaft 44 extends from one side to the other side of the housing member 6. A pair of pinion gears or drive gears 46 are journaled on the power shaft 44 and engage respective elongated rack members 48 that have linear racks of teeth. The rack members 48 extend through power transmission boxes 50 that also supports a guide block of an ultra-high molecular weight polyethylene material. The guide block 52 provides a bearing surface to support the movement of a planar rear surface on the respective rack members 48. The power shaft 44 can be provided with a ¾ inch end shaft fitting that can be turned by a wrench to override the holding brake of the motor 42 to enable a manual operation, if necessary.

Figure 6:
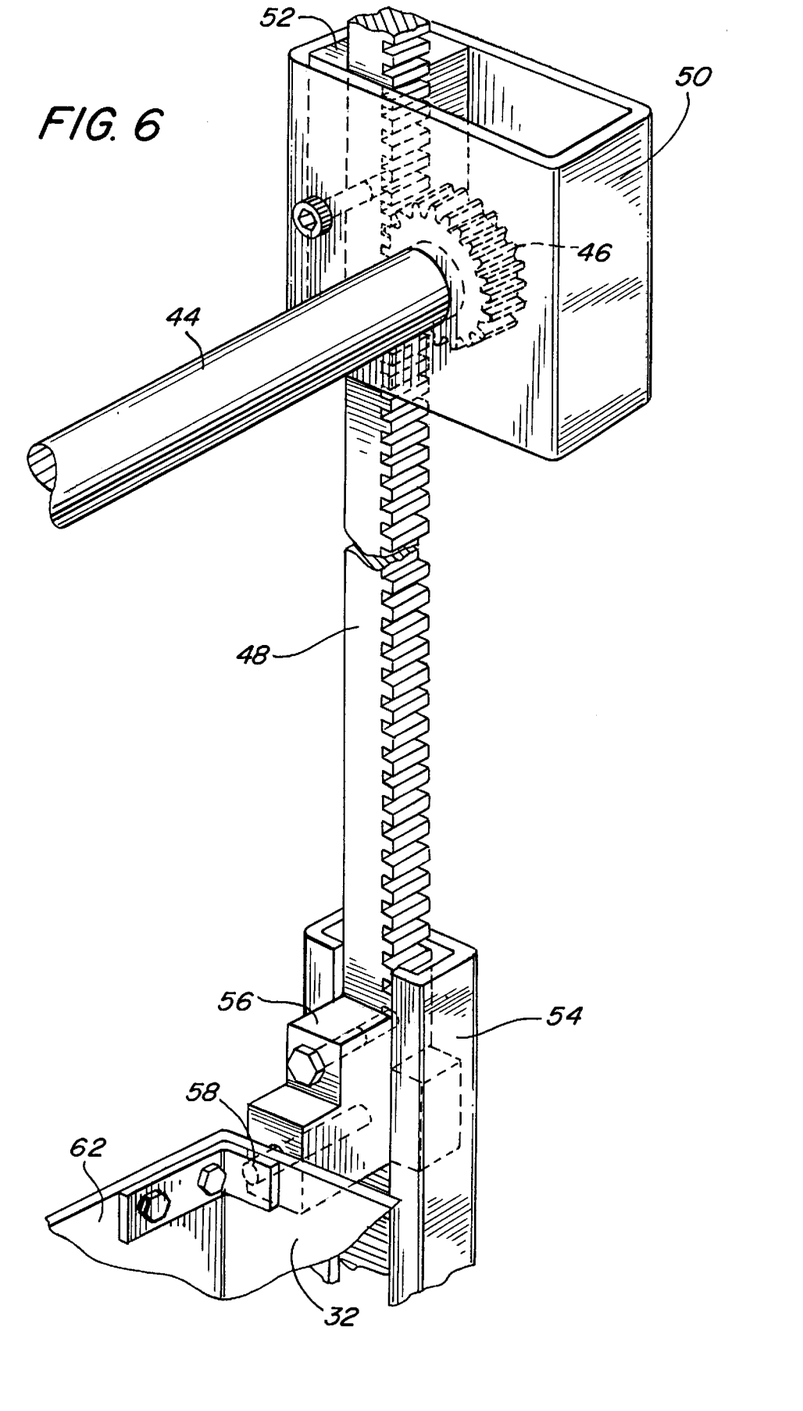
FIG. 6 is a perspective view of the transmission shaft and rack member connected to a pivotal connection.

A lower portion of the rack member 48 is journaled within a C-shaped guide member 54 that is only partly shown in FIG. 6. A connector block 56 is attached by an appropriate fastener, such as a bolt, to each of the respective rack members 48 and supports a pivot shaft 58 which is journaled within the connector block 56. The pivot shaft 58 is fastened to the respective second pivotal connections 38 on each of the triangular frame members 32 and 34. Thus, an appropriate driving of the electric motor 42 produces a force vector, F, at each corner of the bed frame 8 on the second pivotal connections 38 to move them in a vertical linear direction to thereby cause both an extension and a retraction of the bed frame 8. While not shown, appropriate electrical controls and even a safety switch can be incorporated in an electric circuit for the activation of the motor 42.

Each of the triangular frame members 32 and 34 further include back plates 60 and 62 that can be integrally formed with the triangular frame members 32 and 34, respectively. The back plates can provide further support for the mattress when it is inverted to a vertical storage position and can stabilize the position of the second pivotal connections 38.

Figures 7, 8:
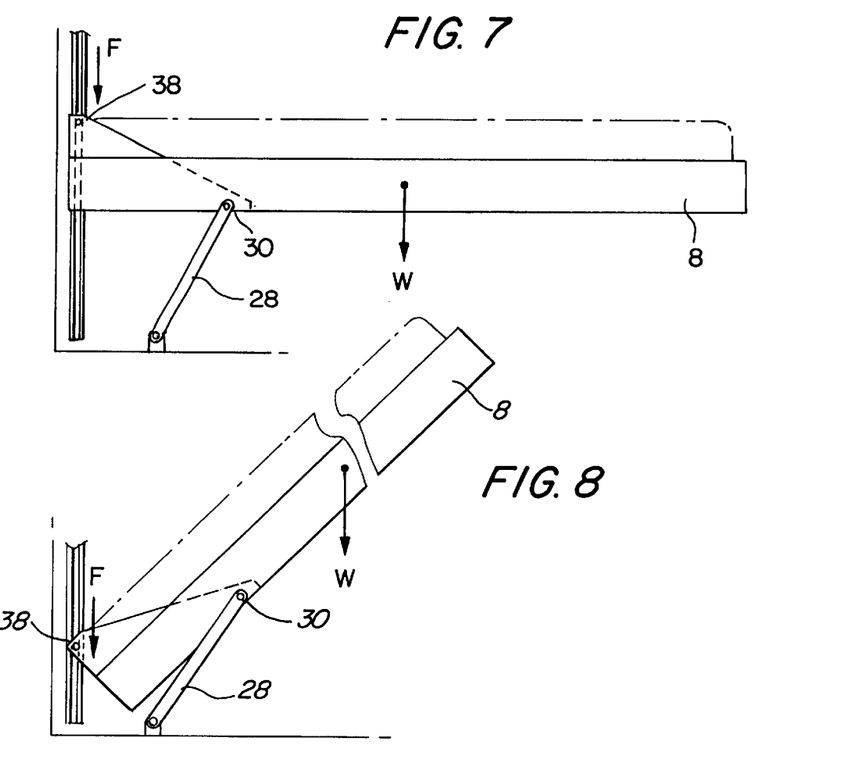
FIG. 7 is a schematic illustrative view of the pivot points and forces associated with the bed in a horizontal operative position.
FIG. 8 is a schematic illustration of the folding bed being moved towards a storage position.
Figure 9:
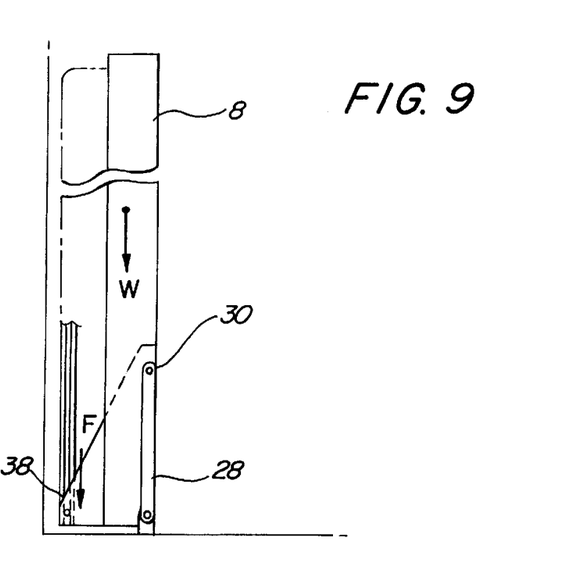
FIG. 9 is a schematic view of the folding bed in a storage position.

Referring to FIGS. 7–9, a schematic illustration of the effect of the force vector, F, can be seen relative to the pivotable support lever 28 and the first pivotal connections 30 and the second pivotal connections 38. In FIG. 7, the pivotal connection 38 is driven vertically downward by the motor assembly when the motor 42 rotates the power shaft 44 and causes drive gears and their respective power transmission blocks to engage the respective rack members 48 and drive them linearly downward through the C-shaped guide members 54. The resulting force vector, F, forces the bed frame 8 to rotate about the first pivotal connection 30, as a support lever 28 is pulled to begin rotating to a vertical position. As seen in FIG. 8, the upper edge of the triangular frame member 32 that supports, at its apex, the second pivotal connection 38 is adjacent the vertical support wall and causes the bed frame 8 to be inverted and to be retracted downward towards a supporting floor. Finally, as shown in FIG. 9, the second pivotal connection 38 is at its lowermost position. The center of the gravity of the bed frame is now between the first pivotal connection 30 and the second pivotal connection 38, and the support lever 28 is aligned with the longitudinal axis of the bed frame 8 and the vertical support wall in a parallel alignment.

While a specific motor and rack assembly is shown, other arrangements can be used to provide a force vector in a vertical plane to drive the bed frame 8. For example, instead of a rack, a chain and pulley arrangement can be used or a ball screw drive with either one or two motors could be used. If a motor is used on each side of the bed frame 8, the transmission power shaft 44 can be eliminated at the bed frame 8 can be positioned closer to the vertical wall.

While not shown, a separate manual locking member can be engaged, if desired, to provide further security for the storage position of the bed frame 8.

The folding bed frame of the present invention can accommodate other furniture accessories than the credenza 20, folding desk 22, and storage cabinets 24, shown in FIG. 2. This modular unit provides a very compact storage space that approximates the actual thickness of the folding bed frame and mattress. This arrangement is of particular value in a recreational vehicle environment.

Figure 10:
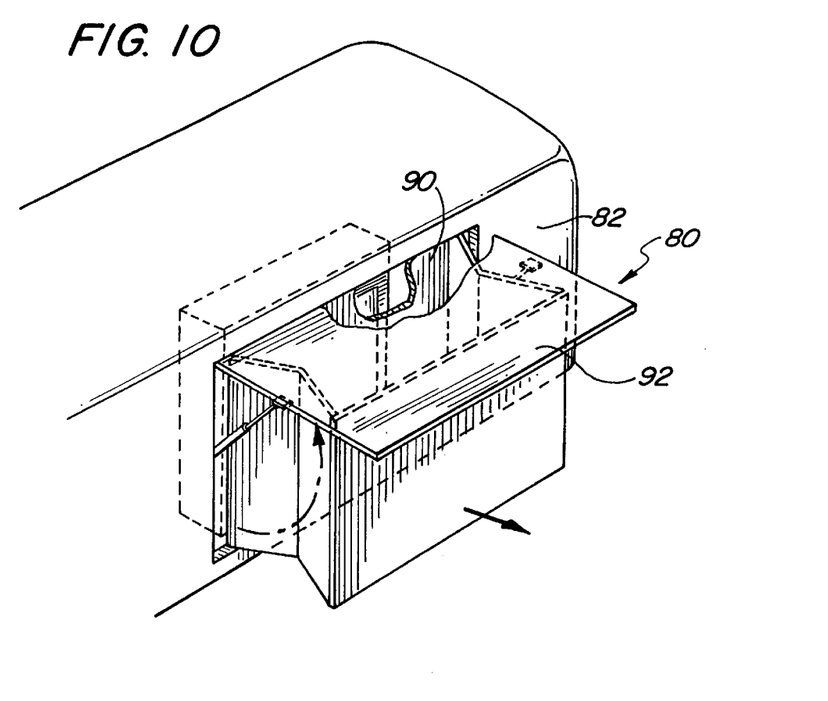
FIG. 10 is a partial perspective cross-sectional view of the folding bed in an extension cabin of a vehicle.
Figure 11:
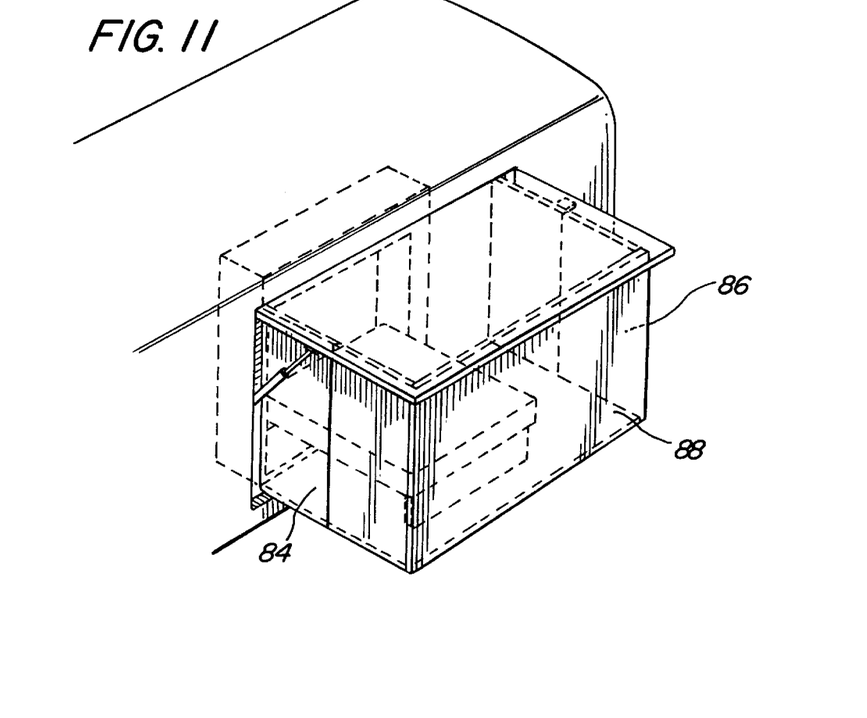
FIG. 11 is a partial perspective view of the extension cabin fully extended with the folding bed in phantom lines.

As can be seen in FIGS. 10 and 11, one possible arrangement of the present invention is a positioning of the folding bed assembly of the present invention so that it can be extended outward into an extensible cabin 80 that has the capacity of folding up to be flush with a side 82 of the vehicle. Thus, the present invention can be arranged not only in the recreational vehicle, such as shown in FIG. 1, but it can be further extend in an operative horizontal arrangement outward from the vehicle to accommodate the advantages of an extensible cabin arrangement. The extensible cabin can include a pair of side folding walls 84 and 86 that are connected to an exterior wall 88. A floor 90 can be arranged to extend downward, while a roof 92 is positioned to pivot upward. In a retracted mode, the roof 92 is pivoted downward to form a side of the vehicle. While not shown, additional supports can extend downward to further stabilize the extensible cabin 80. Thus, the advantages of an extra room for use as either a bedroom or a study in a recreational vehicle with a relatively minimal amount of storage space being required is realized in one embodiment of the present invention.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A vehicle having a combination bed and desk assembly, comprising:
   a vehicle;
   a combination bed and desk assembly mounted in the vehicle adjacent a vehicle wall including:
      a housing member mounted on the wall of the vehicle;
      a plurality of storage cabinets positioned to extend on either side of the housing member;
      a bed frame pivotally mounted at one end adjacent the housing member;
      a motor;
      a rack member pivotally connected to an end of the bed frame and driven by the motor to extend the bed frame to an operative horizontal position from a vertical storage position; and
      a desk member movably connected to the bed frame to be in an operative horizontal storage position when the bed frame is in the vertical storage position and in a storage position when the bed frame is in the horizontal position.

2. A vehicle having an expandable bedroom, comprising:
   a vehicle having a vehicle side wall;
   an expandable cabin connected to the side wall having a roof, a floor, a pair of extendible side walls and an exterior side wall, the roof, the floor, the extendible side walls, and the exterior side wall can fold inward to be stored adjacent the vehicle side wall in a storage mode and can be extended to provide a cabin extending from the vehicle side wall; and
   a folding bed assembly mounted in the vehicle adjacent to the expandable cabin, the folding bed assembly can be vertically aligned in a storage mode and can be horizontally extended outward from the vehicle side wall to be supported in the cabin the folding bed assembly including
      a bed frame pivotally mounted at one end;
      a motor; and
      a rack member pivotally connected to an end of the bed frame and driven by the motor to extend the bed frame to an operative horizontal position from a vertical storage position.

3. The vehicle of claim 2 further including a lever member pivotally connected to the bed frame at one end of the lever member and pivotally connected to a support surface at the other end of the lever member; a support member fixed to the bed frame; and a pivot member connected to the support member and the rack member to permit a pivotal movement of the support member about the pivot member as the level member supports a pivotal movement of the bed frame.

4. A vehicle for providing sleeping accommodations with a folding bed assembly comprising:
   a vehicle housing having an approximately vertical support wall;
   a bed frame for supporting a mattress;
   a movable support lever providing a first pivotal connection to the bed frame, the bed frame rotates about the first pivotal connection when moved from an operative horizontal position with the end of the bed frame parallel and immediately adjacent the vertical support wall to a vertical storage position adjacent the vertical support wall with an upper edge of the bed frame immediately adjacent the vertical support wall;
   a second pivotal connection attached to the upper edge of the bed frame adjacent the vertical support wall and above a height of the mattress; and a motor assembly operatively connected to the second pivotal connection and driving the second pivotal connection approximately parallel to the vertical support wall to provide a force vector to rotate the end of the bed frame about the second pivotal connection as the bed frame also rotates about the first pivotal connection, the second pivotal connection is driven upward parallel and adjacent to the vertical support wall to move the bed frame to the operative horizontal position and is driven downward parallel and adjacent to the vertical support wall to move the bed frame to a vertical storage position, the movable support lever is moved towards the vertical support wall as the bed frame moves from the horizontal position to a vertical storage position whereby the bed frame is closely aligned with the supporting wall to occupy a reduced storage space.

5. The vehicle and folding bed assembly as in claim 4 wherein the motor assembly includes an elongated rack member journaled in the housing member to move in an up and down linear vertical direction, the rack member supports the second pivotal connection.

6. The vehicle and folding bed assembly as in claim 5 wherein the motor assembly includes a motor and a drive gear, the drive gear engages the rack member to drive it up and down in a linear movement.

7. The vehicle and folding bed assembly as in claim 4 wherein the movable support lever is pivotally connected to the housing member and is aligned parallel to the vertical support member and parallel to a longitudinal axis of the bed frame when the bed frame is in a vertical storage position.

8. The vehicle and folding bed assembly as in claim 4 wherein a second movable support lever, providing a third pivotal connection, is connected to the bed frame and a fourth pivotal connection is attached to the end of the bed frame, the motor assembly drives both the second and fourth pivotal connection parallel to the vertical support wall.

9. A combination vehicle and folding bed assembly comprising:
  a bed housing member mounted within the vehicle;
  a lever member pivotally mounted adjacent the housing member;
  a bed frame pivotally mounted to the lever member;
  a rack member pivotally connected to the bed frame to drive the bed frame from a vertical storage position to a horizontal operative position; and
  a motor assembly for driving the rack member whereby the vertical movement of the rack member will cause the bed frame to pivot about the lever member as the lever member pivots away from the housing member.

10. The invention of claim 9 wherein a connection member is fixed to the bed frame and provides a pivotal connection to the lever member and a pivotal connection to the rack member at a position above the lever member when the bed frame is in the horizontal operative position.

11. The invention of claim 9 wherein the rack member is driven in a cyclic linear reciprocating motion by the motor assembly from a vertical storage of the bed frame to an operative horizontal position of the bed frame and a return to a vertical storage.

12. A combination vehicle and folding bed assembly comprising:
  a bed frame;
  a lever member pivotally connected to the bed frame at one end of the lever member and pivotally connected to a support surface at the other end of the lever member;
  a support member fixed to the bed frame;
  a pivot member connected to the support member to permit a pivotal movement of the support member about the pivot member as the lever member supports a pivotal movement of the bed frame; and
  a motor assembly to drive the pivot member in a linear direction whereby the bed frame can pivot about the lever member from a vertical storage position to an operation horizontal position with the bed frame aligning closely with the supporting wall to occupy a reduced storage space, wherein the motor assembly includes a rack member and a motor with a drive gear for driving the rack member in the linear direction.

13. A combination vehicle and folding bed assembly as in claim 12 wherein the rack member moves in a vertical direction parallel to the supporting wall.

14. A combination vehicle and folding bed assembly as in claim 12 wherein the support member is a triangle shaped member having a pivotal connection to the lever member at one apex of the triangle member and a pivotal connection to the pivot member at another apex of the triangle shaped member.

15. A vehicle for providing sleeping accommodations with a folding bed assembly comprising:
  a vehicle housing have an approximately vertical support wall;
  a bed frame for supporting a mattress;
  a movable support lever providing a first pivotal connection to the bed frame, the bed frame rotates about the first pivotal connection when moved from an operative horizontal position to a vertical storage position adjacent the vertical support wall;
  a second pivotal connection attached to an end of the bed frame adjacent the vertical support wall and above a height of the mattress; and
  a motor assembly operatively connected to the second pivotal connection and driving the second pivotal connection approximately parallel to the vertical support wall to provide a force vector to rotate the end of the bed frame about the second pivotal connection as the bed frame also rotates about the first pivotal connection, the movable support lever is moved towards the vertical support wall as the bed frame moves from the horizontal position to a vertical storage position whereby the bed frame is closely aligned with the supporting wall to occupy a reduced storage space, wherein the motor assembly includes an elongated rack member journaled in the housing member to move in an up and down linear vertical direction, the rack member supports the second pivotal connection.

16. A combination vehicle and folding bed assembly comprising:
  a bed frame;
  a lever member pivotally connected to the bed frame at one end of the lever member and pivotally connected to a support surface at the other end of the lever member;
  a support member fixed to the bed frame;
  a pivot member connected to the support member to permit a pivotal movement of the support member about the pivot member as the lever member supports a pivotal movement of the bed frame;
  a motor assembly to drive the pivot member in a linear direction whereby the bed frame can pivot about the lever member from a vertical storage position to an operation horizontal position with the bed frame aligning closely with the supporting wall to occupy a reduced storage space, and a housing member that extends around the bed frame when vertically stored adjacent the supporting wall, the motor assembly includes a motor mounted above the bed frame on the housing member, a rack member journaled within the housing member, a drive gear connected to the motor to drive the rack member in a vertical linear direction, the rack member is connected to the pivot member for moving the pivot member in the vertical linear direction.

17. A combination vehicle and folding bed assembly comprising:

a bed frame;

a lever member pivotally connected to the bed frame at one end of the lever member and pivotally connected to a support surface at the other end of the lever member;

a support member fixed to the bed frame;

a pivot member connected to the support member to permit a pivotal movement of the support member about the pivot member as the lever member supports a pivotal movement of the bed frame; and a motor assembly to drive the pivot member in a linear direction whereby the bed frame can pivot about the lever member from a vertical storage position to an operation horizontal position with the bed frame aligning closely with the supporting wall to occupy a reduced storage space, wherein the support member defines a triangle shaped connection having a pivotal connection to the lever member at one apex of the triangle and a pivotal connection to the pivot member at another apex of the triangle.

* * * * *